Sept. 18, 1962 S. BOWMAN 3,054,300
SPROCKET CHAIN
Filed April 14, 1961

INVENTOR.
SPENCER BOWMAN
BY Oberlin, Maky & Donnelly
ATTORNEYS

United States Patent Office 3,054,300
Patented Sept. 18, 1962

3,054,300
SPROCKET CHAIN
Spencer Bowman, Lakewood, Ohio, assignor to The Thew Shovel Company, Lorain, Ohio, a corporation of Ohio
Filed Apr. 14, 1961, Ser. No. 103,109
12 Claims. (Cl. 74—245)

This invention relates, as indicated, to a sprocket chain and more particularly to improvements in the built-up block or bushing type sprocket chain disclosed more particularly in my copending application, "Sprocket Chain," Serial No. 803,414, filed April 1, 1959, now Patent No. 3,011,356.

In such application there is disclosed a heavy-duty high-speed, built-up block or bushing type sprocket chain of a unique balanced design that produces a chain of optimum strength and life.

Such chains are commonly called rollerless chains and are designed for power transmission of both the high-speed and low-speed type. Primarily, such chains are designed to be employed on heavy machinery operating under extreme conditions of temperature. More particularly, crawler drives of such equipment are often buried in mud, sand and dirt for substantial time intervals striking logs, stones, rock and other debris. Thus a heavy-duty chain is disclosed in such application which will provide the strengths required and the chain life to make operations of such machines more economical.

The built-up block or bushing type chain disclosed in said copending application comprises a series of transversely disposed pins with pairs of outside links of a general figure-eight configuration non-rotatively secured to the ends of such pins. In such chain of pitch P, the pins are approximately 0.36P uniform diameter throughout and have cylindrical bushings rotatably mounted thereon with the bushings having a main portion of approximately 0.56P diameter, such bushings engaging the teeth of sprockets of such given pitch. The end portions of the bushings adjacent the outside links are of reduced diameter and pairs of inside links, alternating with said pairs of outside links, are non-rotatively secured to such bushings. The inside links are also of a general figure-eight configuration and all such links are substantially of the same length, same thickness and same width except preferably the neck width of the inside links is less than that of the outside links. Thus the interconnected blocks of such chain comprise the two inside links and the bushings interconnected by the outside links and the pins.

Accordingly, such chain is available only in lengths which are multiples of twice the pitch P and moreover, when provision is made for chain tension adjustment to compensate for chain wear and elongation, the range of adjustment between the sprockets should be at least about one pitch P. However, with the chain of the present invention, it becomes possible to lengthen or shorten such high-speed, built-up block or bushing type sprocket chain by one pitch and by the same token, the range of adjustment of a sprocket wheel need only be about ½P.

It is then a principal object of the present invention to provide such high-speed, built-up block or bushing type sprocket chain which can be shortened or lengthened by one pitch.

It is a further principal object to provide an easily manufactured offset link which can be employed both with the pin and bushing of the aforementioned chain.

It is a further principal object to provide such chain having an offset link which will not in any way change the over-all dimensions of such chains nor restrict the sprocket openings between the bushings of such chain.

It is a further principal object to provide an offset link for such chain enabling lengthening or shortening of such chain by a single pitch which will not in any way impair the relative movement of adjoining blocks.

It is yet another principal object to provide such offset link having strength characteristics equal to the remaining portion of the chain such that the chain will not in any way be weakened by such offset link.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
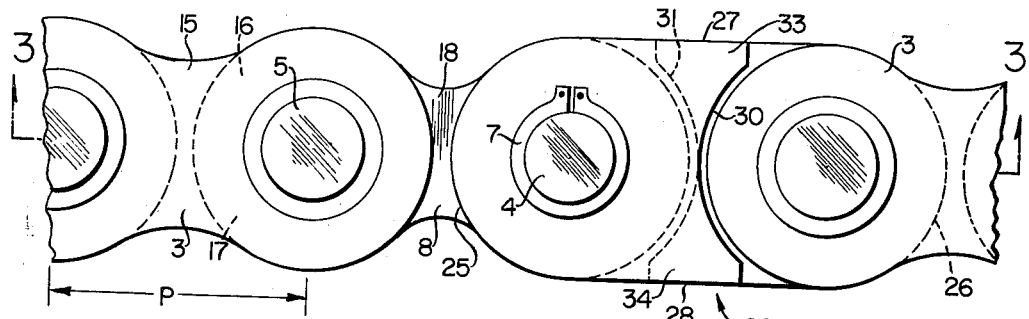
FIG. 1 is a side elevation of a chain in accordance with the present invention.

Referring now more specifically to the drawing, the rollerless or built-up block type sprocket chain disclosed herein corresponds exactly to the chain disclosed in my aforementioned copending application.

Figure 2:
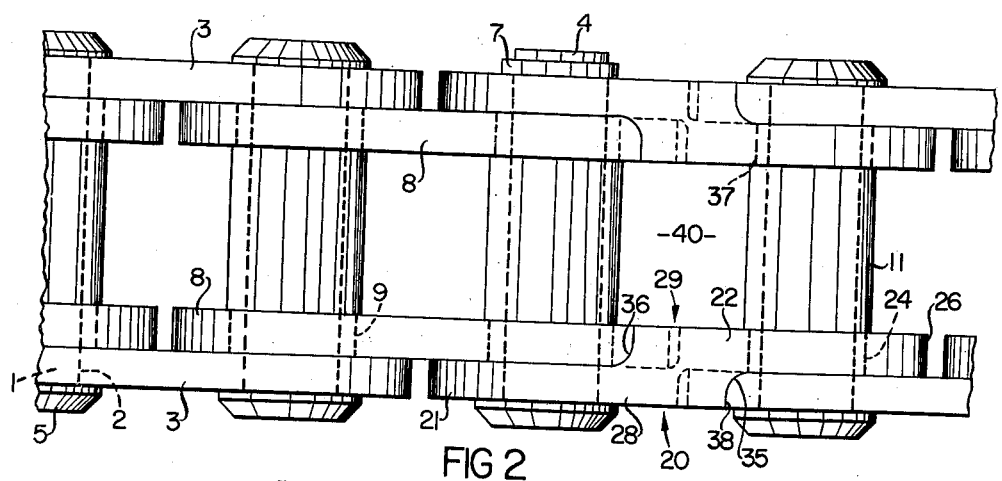
FIG. 2 is a plan view of such chain as seen from the bottom of FIG. 1.
Figure 3:
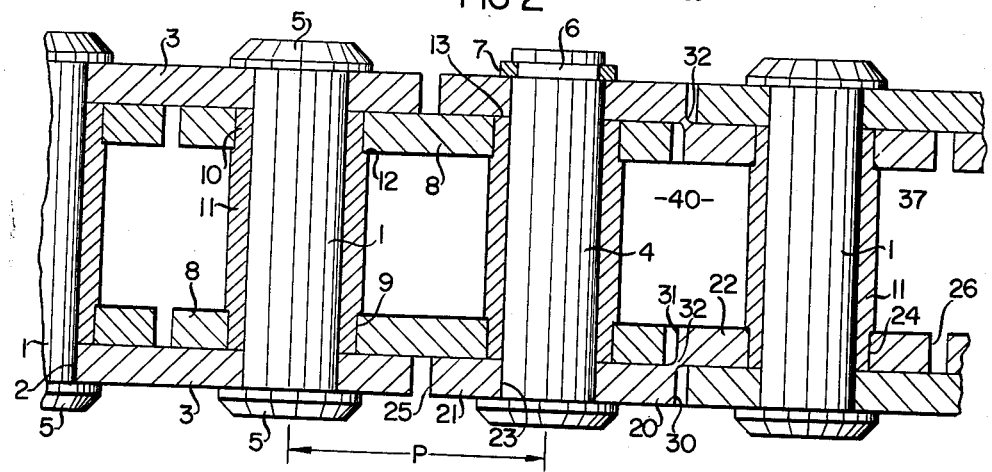
FIG. 3 is a sectional view of such chain taken substantially on the plane of line 3—3 in FIG. 1.

As seen perhaps more clearly in FIGS. 2 and 3, such chain comprises a series of transversely disposed pins 1 of uniform diameter. These pins 1 are carburized or through-hardened and extend in force-fitted relation through pitch holes 2 in parallel outside links 3 of the generally figure-eight shape formed with rounded ends as shown. All of the pins 1 except the connecting pin 4 are provided with heads 5 at both ends. The connecting pin 4 has a head at one end and a peripheral groove 6 at the opposite end for a snap-ring 7 or like retaining member.

Inside and adjacent the parallel outside links 3 are similar figure-8 shape parallel inside links 8 which are formed with rounded ends having holes 9 therethrough in which the reduced diameter ends 10 of bushing 11 are force-fitted with the shoulders 12 thereof in engagement with the inside faces of the inside links 8. The end faces 13 of the bushing are in flush engagement with the outside links and the shoulder 12 thus constitutes a spacer means maintaining the inside and outside links in parallel spaced relation.

It can now be seen that the pins 1 and 4, which are force-fitted to the outside links 3, and the bushings 11, which are force-fitted to the inside links 8, comprise pivotally interconnected blocks with the uniform inside diameters of the bushings rotating about the uniform outside diameters of the pins 1 and 4.

The chain disclosed achieves the aforesaid optimum of life and strength through the employment of certain dimensional relationships, the most critical being the previously mentioned diameter of the pins 1 which is 0.36P and the bushing diameter, in relation to the pin diameter, which is 0.56P.

Also, the following dimensions are employed:

| | |
|---|---|
| Bushing diameter at ends | 0.48P |
| Outside and inside link thickness | 0.16P |
| Outside and inside link width at pitch holes | 0.95P |
| Inside link width at neck | 0.46P |
| Outside link width at neck | 0.58P |
| Outside and inside link radius at end | 0.47P |

It will be seen that the neck 15 of each outside link 3 (see particularly FIG. 1) has been maade somewhat more than ½ the maximum width of the link, namely, 0.58P as opposed to 0.94P for the maximum width. In contrast, each inside link 8 has a neck 18 of width about 0.46P formed, as in the case of the outside link, by concavely curved surfaces tangent to the rounded ends. This proportioning of the neck widths with respect to each other, to the maximum link width at the pitch holes, to the diameter of the pins, and to the diameter of the bushings at the ends, results in a balancing or even distribution of the strains on the links 3 and 8 under heavy loads whereby failure occurs at much heavier load and invariably there is a separation at two zones of the inside links 8 as noted by the reference numerals 16 and 17.

It can then be seen that the neck 18 (FIG. 1) of the inside link is considerably more narrow than the neck 15 of the outside link in that the holes in the inside link for the bushing are larger than the pitch holes in the outside link. This, in effect, weakens the inside link at its neck, but makes its overall fatigue strength much greater. Thus, the cross-sectional area of the inside link at the neck and of the outside link at the neck will be the same as through the bushing hole and pin hole respectively.

As compared to a standard series roller chain A.S.A. (American Standards Association) which has 2 inch pitch, a 0.562" pin diameter, a link thickness of 0.250" and an inside link width of 1.900"; the present chain has a 2 inch pitch chain, a pin diameter of .724" and link thicknesses of .3125" and an inside link width of 1.875". The present chain has been tested at a full strength of approximately 94,000 pounds which is considerably in excess of the A.S.A. standard 2 inch pitch chain.

In order that the chain illustrated can be lengthened or shortened by but a single pitch P, there is provided a special offset link 20 of the same general dimensions overall as the links of the chain which has two different size pitch holes therein in the respective offset end portions, the pin being force-fitted in the smaller pitch hole and the bushing being force-fitted in the larger pitch-hole.

Since it will require an offset link on each side when shortening or lengthening the chain, these links will be identical in form and only the link seen at the bottom in FIG. 3 will be described in detail.

Such link 20 has an outside portion 21 and an offset inside portion 22 with the pitch hole 23 in the outside portion being force-fitted to the pin 4 and the pitch hole 24 in the inside offset portion being force-fitted on the reduced diameter end portion of the bushing 11. The outside portion 21 of the offset link 20 terminates in a rounded end portion 25 (see FIG. 1) struck on a radius of 15/16" (.46P) for the 2 inch pitch chain shown from the center of the pin 4 or pitch hole 23. Similarly, the inside offset portion 22 terminates in a rounded end portion of 15/16" radius struck from the center of the somewhat larger pitch hole 24 as shown at 26. The top and bottom surfaces 27 and 28 of the link are tangent to the curved end portions 25 and 26 and the link is accordingly 1⅞" (.94P) wide. At the center of the link, the link in effect is equal to the thickness of both the inside and outside links of the normal chain. This is true only at the center portion shown at 29. Since there must be some play between the inside and outside links to permit relative pivotal movement about the respective pins, in the offset link illustrated, the width of the portions 21 and 22 will be approximately 0.312" (.16P) whereas the overall thickness of the link at the center portion will be approximately 0.641" (.32P). Th outside portion 21 of the link 20 terminates in an arcuate shoulder 30 which may be struck on a 1" (.50P) radius from the center of the pin 1 or pitch hole 24 as the case may be to provide a substantial clearance between such shoulder and the outside link 3 mating therewith. Similarly, the inside portion 22 of the offset link terminates in arcuate shoulder 31 likewise strick on a 1" (.50P) radius from the center of pin 4 or pitch hole 23. The shoulder 30 joins the inside offset portion 22 in a 1/16" (.03P) radius, shown slightly exaggerated, as does the shoulder 31 join the outside portion 21. At the very center of the link this produces a very thin web 32. Thus the cross-sectional area at the center of the link is extremely small, but such area increases toward the respective top and bottom surfaces 27 and 28 to the thickened portions 33 and 34 such that the transverse sectional area of the link will be substantially uniform throughout. The arcuate shoulders 30 and 31 may terminate in edges extending normal to the top and bottom surfaces 27 and 28 to eliminate sharp edges and these will join the opposite link portions in slightly larger radii, e.g. 3/16" (.09P) as shown at 35 and 36. A 1/32" x 45° chamfer 37 on the inside of the pitch hole 24 in the inside portion 22 of the link may be employed to accommodate the reduced end portion on the bushing 11. The overall length of the offset link will be 3⅞" (1.94P) in the 2" pitch chain and the arcuate shoulder 30 will be cut away on the bottom surface of the link as shown at 38 2 5/16" (1.16P) from the one end of the link and the opposite shoulder will be similarly cut away 1 9/16" (.78P) from the same end of the link.

It can now be seen that the offset links 20 provide a substantial continuation of both the inside and outside links of the chain and do not in any way impair the relative movement of the blocks about the respective pins and bushings nor do the links in any way restrict the size of the opening 40 into which the tooth of the standard sprocket wheel must fit.

Since it is not imperative that the inside and outside links 3 and 8 be necked as shown at 15 and 18, it will be understood that the link 20 would then present a top and bottom surface configuration which would be a substantial continuation of such modified links 3 and 8. In other words, the offset link is the same width as the rest of the links in the chain.

In order, for example, to lengthen the chain by one pitch P, the snap-ring or like fastener 7 can be removed and the pin 4 then withdrawn from the chain whereby the outside links of a block can then be withdrawn. The assemblage of two links 20 with a bushing 11 inserted between the inside offset portions is then substituted for the outside links and the pin 4 is reinserted through pitch holes 23 and the snap ring 7 locked in place. With the bushing 11 secured between the two inside portions 22 of the offset links, the withdrawn outside links are then aligned with the hole in the bushing and an additional pin is inserted therethrough and the chain is then rejoined now one pitch P longer than before. To shorten the chain by a single pitch, a complete block is removed, shortening the chain by 2P and then a single pitch P is added by means of the offset links following the above procedure.

Other modes of applying the principles of the invention may be employed, change being made as regards the details described, provided the features stated in any of the following claims or the equivalent of such be employed.

I, therefore, particularly point out and distinctly claim as my invention:

1. In a heavy-duty, high-speed, built-up block or bushing type sprocket chain of given pitch P, having a series of transversely disposed pins of approximately 0.36P uniform diameter throughout, pairs of outside links having transverse holes wherein the ends of successive pairs of said pins are non-rotatively secured, cylindrical bushings rotatably mounted on each of said pins between said outside links, said bushings each having a main portion of approximately 0.56P diameter to engage the teeth of a sprocket of such given pitch, and end portions of reduced diameters adjacent said outside links, and pairs of inside links alternating with said pairs of outside links having transverse holes wherein such ends of said bushings are non-rotatably secured; a pair of offset links in said chain having outside portions of the same thickness as said outside links, transvesre holes in said outside portions non-rotatively securing said links to one said transversely disposed pin, inside portions of the same thickness as said inside links having transverse holes therein non-rotatively securing said offset links to one said cylindrical bushing next adjacent said pin whereby said chain may be shortened or lengthened by one pitch P.

2. The chain set forth in claim 1 wherein said offset links terminate in rounded end portions, the center section joining said inside and outside portions of said link including oppositely extending arcuate portions adapted to receive the inside and outside links of said chain.

3. The chain as set forth in claim 2 wherein said arcuate portions are struck on a radius slightly larger than the radius of rounded end portions of the inside and outside links adapted to mate therewith.

4. The chain as set forth in claim 3 wherein said arcuate end portions come substantially together at the center and are separated thereat by a relatively thin web.

5. The chain set forth in claim 1 wherein said offset portions provide radial clearance whereby said inside and outside links may rotate with respect thereto.

6. In a heavy-duty, high-speed, built-up block or bushing type sprocket chain of given pitch P, the combination of a series of transversely disposed pins of approximately 0.36P uniform diameter throughout and of substantially uniform length, series of outside links having transverse holes wherein the ends of successive pairs of said pins are non-rotatively secured, cylindrical bushings rotatably mounted on each of said pins between said outside links, said bushings having a main portion of approximately 0.56P diameter to engage the teeth of a sprocket of such given pitch, end portions of reduced diameter adjacent said outside links, inside links alternating with said pairs of outside links having transverse holes wherein such ends of said bushings are non-rotatively secured; a pair of offset links interconnecting adjacent transversely disposed pins, said offset links having outside portions non-rotatively secured to one said pin, and inside portions non-rotatively secured to a bushing mounted on said adjacent pin.

7. In a chain as set forth in claim 6 wherein said inside and outside links are substantially of the same uniform longitudinal thickness, said inside and outside portions of said offset link being substantially the same thickness as said inside and outside links to present a substantial longitudinal continuation of said links.

8. In a chain as set forth in claim 6 wherein said inside and outside links have rounded end portions, and said offset links have arcuate oppositely offset portions adapted to mate with said rounded end portions of said inside and outside links, said arcuate portions being of a radius substantially larger than yet concentric with the radius of said rounded end portions thereby freely to accommodate relative pivotal movement of said offset link and said inside and outside links.

9. The combination of claim 8 wherein said outside links are of generally figure-eight shape with rounded ends of about .47P radius struck from the axes of such holes and said arcuate portions of said offset links are about .50P radius struck from the axes of such holes.

10. The combination of claim 6 wherein said inside links are of generally figure-eight shape with rounded ends of about .47P radius struck from the axes of such holes and with intermediate neck portions of about .46P width formed by concavely curved surfaces that are tangent to the .47P radii of such rounded ends.

11. The combination of claim 6 wherein said inside and outside links are of generally figure-eight shape with rounded ends of about .47P radius struck from the axes of such holes and with intermediate neck portions respectively of about .46P and .58P width formed by concavely curved surfaces that are tangent to the .47P radii of such rounded ends.

12. The combination of claim 6 wherein said outside links are of generally figure-eight shape with rounded ends of about .47P radius struck from the axes of such holes and with intermediate neck portions of about .58P width formed by concavely curved surfaces that are tangent to the .47P radii of such rounded ends.

References Cited in the file of this patent

UNITED STATES PATENTS

| | | |
|---|---|---|
| 2,162,042 | Welser | June 13, 1939 |
| 2,182,443 | McAninch | Dec. 5, 1939 |
| 2,773,971 | Teerlink | Dec. 11, 1956 |

OTHER REFERENCES

German application No. W10684 XII/47d, printed Feb. 23, 1956.